Jan. 8, 1963 M. CZUHA, JR 3,072,556
METHOD OF MAKING ELECTROLYTIC MEASURING CELL
Original Filed Feb. 3, 1958
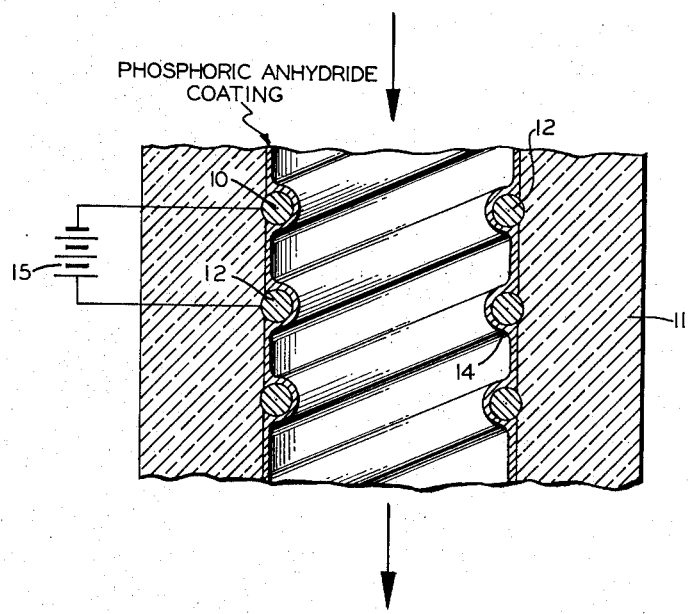
INVENTOR.
MICHAEL CZUHA, JR.
BY
ATTORNEYS Patented Jan. 8, 1963

3,072,556
METHOD OF MAKING ELECTROLYTIC MEASURING CELL
Michael Czuha, Jr., Temple City, Calif., assignor to Consolidated Electrodynamics Corporation, Pasadena, Calif., a corporation of California
Original application Feb. 3, 1958, Ser. No. 712,963, now Patent No. 3,014,858, dated Dec. 26, 1961. Divided and this application Mar. 25, 1960, Ser. No. 17,698
5 Claims. (Cl. 204—195)

This invention relates to an improved electrolytic cell of the type employing a normally solid hygroscopic electrolyte, and is a division of my copending application Serial No. 712,963, filed February 3, 1958, now Patent No. 3,014,858.

Cells currently finding use in commercial moisture analyzers are illustrative of this type of electrolytic cell, and the invention is described as applied to an electrolytic moisture analyzer.. A typical cell comprises a pair of spaced conductive wire electrode coils wound with individual turns of one coil disposed between adjacent turns of the other coil, the coils being supported against the inside wall of an enclosing tube or housing. A film of a hygroscopic electrolyte, such as phosphorus pentoxide, is deposited on the coils and housing interior to electrically bridge the spaces between adjacent turns of the two wire helices.

A suitable voltage is applied to the two electrode coils, and when the electrolyte is conductive, say upon absorption of moisture, an electrolytic cell exists between the alternately spaced turns of the electrode coils. In operation, therefore, as moisture is absorbed by the electrolyte from a gas stream flowing past the coils, the electrolyte becomes conductive, current flows between the coils in the regions of conductivity and the water is electrolyzed to hydrogen and oxygen. The electrolyte is thereby continuously regenerated and the electrical energy consumed is an accurate measure of the moisture absorption in accordance with Faraday's laws.

Two characteristics are important in the deposition of the electrolytic film. First, the process for depositing the film should be fairly rapid to keep cost of manufacture to a minimum, and second, the film should be uniform and of the proper thickness to provide rapid response to changes in moisture concentration. I have discovered that there is an optimum thickness of the film to provide rapid response to changes in moisture concentration. If the film is too thick, there is an undesirable time lag in response due to the amount of material through which the moisture must diffuse. On the other hand, if the film is made too thin, the response time also increases, probably because certain portions of the film become, in effect, discontinuous.

Prior to this invention, the electrolytic film was deposited to the cell on the coils and tube interior by filling the tube with an aqueous solution of electrolyte, and then blowing air through the tube to remove excess moisture. Thereafter, voltage was applied to the two coils to effect electrolytic complete drying of the electrolyte, leaving a solid film of electrolyte deposited on the electrode coils and the tube interior.

This prior procedure of depositing the electrolytic film has the disadvantage that it requires a relatively long drying time to prepare the film, and in addition, often results in the deposition of a relatively thick and non-uniform film which produces an instrument with an undesirably long response time. The uneven deposition of the electrolytic film is further aggravated in prior art cells in which the housing or tube is made of a material such as polytetrafluoroethylene (known commercially as "Teflon"). Teflon has a hydrophobic surface, and therefore is not uniformly wetted by the aqueous solution of the electrolyte, with the result that an uneven and undesirably thick film of electrolyte must be deposited in order to insure a continuous coating. Even the use of wetting agents has failed to provide the uniform thin film of electrolyte desirable for fast response times.

This invention provides an electrolytic cell with a thin uniform film of electrolyte which provides high speed response not previously available with electrolytic cells of this type. In addition, the invention provides a method for depositing thin uniform electrolyte films in much less time than is possible with the techniques used prior to this invention.

An electrolytic cell in accordance with this invention includes a support member and a pair of spaced electrodes on the support member. A film of electrolyte is deposited on the electrodes and support so that the film has a thickness between about 30 microinches and about 200 microinches.

In the preferred form of the invention, the electrolyte is a hygroscopic material which becomes virtually nonconducting when it is dry. Examples of such materials are phosphorus pentoxide, sodium hydroxide, potassium hydroxide, and potassium metaphosphate. Also in the preferred form of the invention, the support is a material with a hydrophilic surface such as glass, the term "glass" being used herein to include the various silica glasses, and in general, any vitreous material which is malleable in a fairly wide temperature range and which is hard and generally inelastic below such range.

In terms of method, the invention contemplates making an electrolytic cell by disposing a pair of spaced electrodes on a support member. A water solution of an electrolyte mixed with an organic liquid having a higher vapor pressure than water is applied to the electrodes and support member. Thereafter, the electrodes and support member are dried to leave a substantially solid coating of electrolyte on the electrodes and support member. Preferably the drying is effected by passing a gas stream over the electrodes and support member. The organic liquid evaporates rapidly into the gas stream, leaving a thin, tacky film of concentrated electrolyte solution evenly distributed over the electrodes and support. Also in the preferred method, the residual water in the film of electrolyte is removed by electrolysis.

In the preferred form of the invention, the water-miscible organic liquid is a relatively low molecular weight polar compound such as acetone, methanol, or dioxane, although other organic liquids which are miscible in water and which have a relatively high vapor pressure, can be used, such as the low molecular weight aldehydes and esters. In general, the organic liquid should be polar, having a higher vapor pressure than water, and be inert to the electrolyte anhydride or hydrate, at least for a period of several hours.

These and other aspects of the invention will be more fully understood from the following detailed description taken in conjunction with the accompanying drawing which is an enlarged sectional elevation of an electrolytic cell having an electrolytic film deposited in accordance with this invention.

Referring to the drawing, a first electrode helical coil 10 is partially embedded in the interior wall of a tube or housing 11 made of a suitable material such as Pyrex or soft glass. A second electrode helical coil 12 is also embedded in the housing interior with each of its turns located between adjacent turns of the first coil. The electrode coils may be of any suitable material, such as platinum, and may be of any suitable dimension. Good results have been obtained using 3 mil wire with a 3 mil spacing between adjacent turns supported in a soft glass tube having an I.D. of about .023 inch. A thin, uniform electrolytic film 14 is deposited on the interior surface of the electrolytic cell housing and on the exposed areas of the electrode coils so that each turn of each electrode coil is bridged to the adjacent turn of the other electrode coil by the electrolytic film. The electrode coils are connected to opposite terminals of a D.C. power source 15 to complete the electrolytic cell. A sample stream (not shown) is adapted to flow axially through the electrolytic cell housing.

The electrolytic film is deposited as shown in the drawing by filling the electrolytic cell with a mixture of a water solution of the electrolyte and a suitable organic liquid which is miscible with the electrolyte water solution. A gas stream is passed axially through the housing to remove excess liquid and to permit the organic liquid to evaporate rapidly, leaving a thin, tacky film of concentrated electrolyte solution deposited on the coils and housing interior.

Of all the various organic liquids and electrolytes considered, it is presently preferred to use a mixture of acetone and a solution of orthophosphoric acid. Using acetone as the organic liquid for preparation of the orthophosphoric acid solution, a rapid initial drying of the electrolytic film was obtained. The mixture had a relatively low viscosity so it readily spread over and wet the entire exposed surfaces of the coil and housing interior. The acetone evaporated rapidly into the gas stream, leaving behind in the cell a thin tacky film of concentrated aqueous orthophosphoric acid evenly distributed over the electrodes and the housing interior. The final residual water was removed by electrolysis, that is, by applying a suitable voltage across the electrode coils, leaving a dry film of phosphorus pentoxide ($P_2O_5$).

The coating solution was prepared by mixing various volumes of 85% orthophosphoric acid in water with sufficient acetone to make 100 milliliters of solution. Using the various solutions in the manner prescribed above, the initial drying time of the electrolytic cell was reduced from more than one hour, which is the time required when a volatile organic liquid is not used, to considerably less than an hour.

The following table shows the results obtained with the various acetone solutions:

Table

| Percent of 85% $H_3PO_4$ in acetone (by wt.) | Vol. of 85% $H_3PO_4$ added to acetone to make 100 ml. of sol. (ml.) | Initial drying time (min.) | Response Time (sec.) | | Film thickness (inches) |
|---|---|---|---|---|---|
| | | | Dec. moist. | Inc. moist. | |
| 3.7 | 1.8 | 3.3 | 89 | 84 | .000008 |
| 7.3 | 3.7 | 5.0 | 61 | 45 | .000015 |
| 14.5 | 7.3 | 10.6 | 33 | 31 | .000031 |
| 29 | 14.6 | 15 | 28 | 22 | .000062 |
| 58 | 29.2 | 37 | 19 | 17 | .000124 |
| 87 | 43.8 | 78 | 67 | 22 | .000186 |

The data in the table show that the initial drying time and film thickness increased as increasing amounts of orthophosphoric acid solution were used. The initial drying time can be further decreased if, in the above examples, the acetone is replaced with about 50% by volume of a more volatile liquid, such as diethyl ether. The ether is less miscible with water than acetone, so when both organic liquids are used, it is preferred to mix the acetone and water solution of electrolyte first, and then add the ether.

The response time given in the table is the amount of time required for a 63% change in reading when the moisture content of sample flowing through the cell is suddenly changed, stepwise, between 20 and 700 parts per million. The values under the column label "Dec. moist." (decreasing moisture) are the response times when the moisture in the sample is dropped from 700 to 20 p.p.m. The values under "Inc. moist." (increasing moisture) are the response times when the moisture in the sample is increased from 20 to 700 p.p.m. The reason for the differences in response time for decreasing and increasing moisture content is not fully understood at this time, but the data do show that the minimum response time, for both the decreasing and increasing readings, occurs when the film thickness is between about .000031 and about .000186 inch.

The thin uniform film laid down in accordance with this invention results in an instrument with a high response speed to variations in moisture content between 20 and 700 parts per million. The response time for a 63% change in reading is less than 20 seconds, well within the 30 second limit ordinarily specified for quality control, and a marked improvement over previously available instruments with response times of from several to more than 30 minutes. This improved response characteristic is apparently associated with the controlled thin uniform film of phosphoric anhydride that can be deposited using the volatile organic solutions. Also, an important factor probably is the use of glass as the substrate in the electrode assembly, which is more completely wetted by the coating solution than when hydrophobic materials such as Teflon are used.

Moreover, previous instruments using Teflon, and consequently requiring relatively thick films of electrolyte anhydrides, require specific calibration for measuring moisture in certain types of sample streams, e.g., Freon streams. With the electrolytic cell made in accordance with this invention, special calibration runs are not necessary with such streams, it being possible to read moisture concentrations directly.

I claim:

1. The method of making an electrolytic cell comprising the steps of disposing a pair of spaced electrodes in a housing having an opening through it, filling the housing with a water solution of a hygroscopic electrolyte and a water-miscible organic liquid having a higher vapor pressure than water to wet the electrodes, there being sufficient electrolyte dissolved in the solution to leave a continuous deposit of dried electrolyte when the solution is evaporated, thereafter passing a stream of gas through the housing to dry the electrodes and leave a substantially solid and continuous coating of electrolyte on them and applying a voltage to the electrodes to remove residual water from the electrolyte coating by electrolysis.

2. The method of making an electrolytic cell comprising the steps of disposing a pair of spaced electrodes in a housing having an opening through it, filling the housing with a water solution of a hygroscopic electrolyte selected from the group consisting of orthophosphoric acid, sodium hydroxide, potassium hydroxide, and potassium metaphosphate and an organic water-miscible liquid having a higher vapor pressure than water to wet the electrodes, there being sufficient electrolyte dissolved in the solution to leave a continuous deposit of dried electrolyte when the solution is evaporated, thereafter passing a stream of gas through the housing to dry the electrodes and leave a substantially solid and continuous coating of electrolyte on them and applying a voltage to the electrodes to remove residual water from the electrolyte coating by electrolysis.

3. The method of making an electrolytic cell comprising the steps of disposing a pair of spaced electrodes in a housing having an opening through it, filling the housing with a water solution of a hygroscopic electrolyte and an organic water-miscible liquid having a higher vapor pressure than water and selected from the group consisting of dioxane, ketones, aldehydes, esters, and alcohols, the organic liquid being inert to the electrolyte anhydride and hydrate for at least several hours, there being sufficient electrolyte dissolved in the solution to leave a continuous deposit of dried electrolyte when the solution is evaporated, thereafter passing a stream of gas through the housing to dry the electrodes and leave a substantially solid and continuous coating of electrolyte on them and applying a voltage to the electrodes to remove residual water from the electrolyte coating by electrolysis.

4. The method of making an electrolytic cell comprising the steps of disposing a pair of spaced electrodes in a housing having an opening through it, filling the housing with a water solution of orthophosphoric acid mixed with acetone to wet the electrodes, there being sufficient electrolyte dissolved in the solution to leave a continuous deposit of dried electrolyte when the solution is evaporated, thereafter passing a stream of gas through the housing to dry the electrodes and leave a substantially solid and continuous coating of electrolyte on them and applying a voltage to the electrodes to remove residual water from the electrolyte coating by electrolysis.

5. The method according to claim 4 in which the mixture of acetone and water solution of orthophosphoric acid contains by weight between about 14% and about 87% of 85% orthophosphoric acid in water.

References Cited in the file of this patent

UNITED STATES PATENTS

| | | |
|---|---|---|
| 1,109,670 | Feidt | Sept. 8, 1914 |
| 1,182,013 | Hunter | May 9, 1916 |
| 1,240,395 | Westerfield et al. | Sept. 18, 1917 |
| 1,424,969 | White | Aug. 8, 1922 |
| 2,516,663 | Funick | July 25, 1950 |
| 2,688,568 | Miskel et al. | Sept. 7, 1954 |
| 2,816,067 | Keidel | Dec. 10, 1957 |
| 2,830,945 | Keidel | Apr. 15, 1958 |

FOREIGN PATENTS

| | | |
|---|---|---|
| 704,552 | Great Britain | Feb. 24, 1954 |